United States Patent
Terao et al.

[11] Patent Number: 5,941,534
[45] Date of Patent: Aug. 24, 1999

[54] HYDRAULIC SEAL SYSTEM

[75] Inventors: Kiminobu Terao; Kouji Ueda; Yorinori Kumagai; Takamichi Shimada; Kenji Amano, all of Saitama; Toshio Oka; Junya Nagai, both of Niigata, all of Japan

[73] Assignee: Honda Giken Kogyo Kabushiki Kaisha, Tokyo, Japan

[21] Appl. No.: 08/542,082

[22] Filed: Oct. 12, 1995

[30] Foreign Application Priority Data

Oct. 12, 1994 [JP] Japan ................................. 6-246225
Oct. 25, 1994 [JP] Japan ................................. 6-259926
Nov. 14, 1994 [JP] Japan ................................. 6-278753

[51] Int. Cl.$^6$ ........................................ F16J 15/40
[52] U.S. Cl. ................................. 277/580; 277/582
[58] Field of Search ........................... 277/579, 580, 277/581, 582

[56] References Cited

U.S. PATENT DOCUMENTS

| | | | |
|---|---|---|---|
| 2,444,119 | 6/1948 | Thorn et al. | 277/177 |
| 2,783,068 | 2/1957 | Bloom et al. | 277/177 |
| 3,259,392 | 7/1966 | Peickii et al. | 277/177 |
| 3,887,198 | 6/1975 | McClure et al. | 277/177 |
| 4,098,515 | 7/1978 | Sakata | 277/165 |
| 4,203,607 | 5/1980 | Brieger . | |
| 4,633,907 | 1/1987 | Adams | 277/177 |
| 4,729,569 | 3/1988 | Muller et al. | 277/27 |
| 4,889,349 | 12/1989 | Muller | 277/177 |
| 5,118,119 | 6/1992 | Dittinger | 277/177 |
| 5,123,662 | 6/1992 | Sugimura | 277/177 |

FOREIGN PATENT DOCUMENTS

| | | | |
|---|---|---|---|
| 2122274 | 7/1990 | Japan . | |
| 8803548 | 5/1988 | WIPO | 277/177 |

*Primary Examiner*—Anthony Knight
*Assistant Examiner*—John L. Beres
*Attorney, Agent, or Firm*—Lyon & Lyon LLP

[57] ABSTRACT

A hydraulic seal system includes a seal ring groove and a seal ring mounted in the seal ring groove. The seal ring and seal ring groove are rotatable relative to each other, and have sealing sides, respectively, which are put into pressure contact with each other by a sealing hydraulic pressure. The seal ring is made of a synthetic resin to have a fixed elasticity. The sealing side of the seal ring is formed into a convex curved surface with its radially central portion raised, so that when a hydraulic pressure is applied, the sealing side can be compressedly deformed to define a hydraulic pocket. Thus, the formation and retaining of an oil film at the pressure contact portions of the sealing sides is promoted.

16 Claims, 13 Drawing Sheets

(After 50 hr from start of test)

Rounded or chamfered (After 50 hr from start of test)

Non-rounded and non-chamfered

HYDRAULIC SEAL SYSTEM

BACKGROUND OF THE INVENTION

1. Field of the Invention

The present invention relates to a hydraulic seal system, including: an annular seal ring groove which is defined in one of mutually opposed peripheral surfaces of a shaft member and a housing surrounding the shaft member, the shaft member and the housing being relatively rotatably disposed, and a seal ring mounted in the seal ring groove to come into contact with the other of the peripheral surfaces of the shaft member and the housing, such that when the seal ring receives a hydraulic pressure mutually opposed sealing sides of the seal ring and the seal ring groove are brought into pressure contact with each other.

2. Description of the Prior Art

There is a known hydraulic seal system including a seal ring made of cast iron and having a sealing side which is formed into a convex curved surface with its radially central portion raised, and which is put into pressure contact with a flat sealing side of a seal ring groove by hydraulic pressure (see Japanese Utility Model Application Laid-open 122274/90).

In the above known system, the sealing side of the seal ring is in the form of a convex curved surface and hence, the contact of the sealing side of the seal ring with the sealing side of the seal ring groove appears to be smooth at first view. However, the seal ring is made of cast iron into a rigid member, and therefore, upon an increase in hydraulic pressure, the convex curved surface of the seal ring may bite into the sealing side of the seal ring groove to break down the oil film provided between the sealing sides, thereby accelerating the wearing of each sealing side due to a failure of lubrication and deteriorating the sealability and endurance.

SUMMARY OF THE INVENTION

Accordingly, it is an object of the present invention to provide a hydraulic seal system of the above-described type, wherein an oil film can be satisfactorily formed and retained between both the sealing sides of the seal ring and the seal ring groove by utilizing hydraulic pressure, thereby exhibiting excellent sealability and endurance.

To achieve the above object, according to a first aspect and feature of the present invention, there is provided a hydraulic seal system, comprising: an annular seal ring groove which is defined in one of mutually opposed peripheral surfaces of a shaft member and a housing surrounding the shaft member, the shaft member and the housing being relatively rotatably disposed; and a seal ring mounted in the seal ring groove to come into contact with the other of the peripheral surfaces of the shaft member and the housing, such that when the seal ring receives a hydraulic pressure, mutually opposed sealing sides of the seal ring and the seal ring groove are brought into pressure contact with each other, wherein the sealing side of the seal ring groove is formed into a flat surface, and the sealing side of the seal ring is formed into a convex curved surface with its radially central portion raised, the seal ring being made of a synthetic resin to have an elasticity such that when hydraulic pressure is applied to the seal ring, the sealing side of the seal ring can be elastically deformed to form a hydraulic pocket connected to the pressure contact portions of both the sealing sides.

With the first feature of the present invention, when the hydraulic pressure is applied, the sealing side of the seal ring made of the synthetic resin is elastically deformed to define the hydraulic pocket connected to the pressure contact portions of the sealing sides of the seal ring and the seal ring groove. Therefore, an increase in contact pressure of the sealing side is suppressed by the hydraulic pocket, and an oil is satisfactorily supplied to the pressure contact portions of the sealing side by a capillary phenomenon, and the formation and retaining of an oil film at the pressure contact portions is promoted.

When the hydraulic pressure is varied, the sealing side of the seal ring is elastically deformed to change the volume of the hydraulic pocket and transfers elasticity, and therefore, it is possible to suppress the variation in contact pressure of both the sealing sides, resulting in improved sealability and endurance.

According to a second aspect and feature of the present invention, in addition to the first feature, the hardness of the seal ring is set in a range of 80 to 120 $H_{RM}$.

With the second feature of the present invention, it is possible to suppress the wearing of the shaft member from exceeding a fixed amount i.e., wear on the sealing side of the seal ring groove, by a simple means of setting the hardness of the seal ring, thereby further improving the sealability and endurance.

Furthermore, according to a third aspect and feature of the present invention, in addition to the first or second feature, the shaft member is made of an aluminum alloy.

According to a fourth aspect and feature of the present invention, in addition to the first feature, the seal ring includes a cylindrical outer peripheral surface and a sealing side surface in the form of a convex curved surface with its radially central portion raised and is made of a synthetic resin to have an elasticity such that when the shaft member and the housing are in inclined states, the seal ring can be torsionally deformed to maintain the surface contact of the outer peripheral surface of the seal ring with the inner peripheral surface of the housing by the hydraulic pressure.

With the fourth feature of the present invention, when the shaft member and the housing are inclined due to the chattering and deflection of the housing, the seal ring made of the synthetic resin and the predetermined elasticity can be torsionally deformed so as to follow the inclination, thereby maintaining the surface contact state of the outer peripheral surface of the seal ring with the inner peripheral surface of the housing to continually exhibit the normal outer periphery-sealing function to the housing.

In addition, since the sealing side of the seal ring is in the form of the convex curved surface, the seal ring is rolled on the sealing side of the seal ring groove with the torsional deformation of the seal ring and hence, the change in their contact states does not occur, making it possible to continually exhibit the normal side-sealing function to the shaft member.

According to a fifth aspect and feature of the present invention, in addition to the fourth feature, each of the corners of the seal ring at which the sealing side intersects inner and outer peripheral surfaces is chamfered.

With the fifth feature of the present invention, even if the inclination of the shaft member and the housing becomes excessive, so that the corner of the seal ring is put into contact with the sealing side of the seal ring groove, an edge contact can be avoided to prevent a breakage of the oil film between the shaft member and the housing, thereby reducing the wearing of the shaft member.

According to a sixth aspect and feature of the present invention, in addition to the first feature, the shaft member or the housing having the seal ring groove is made of an aluminum alloy, and the sealing side of the seal ring groove has a surface roughness set in a range of Rmax 3.0 to 6.3 μm, and the sealing side of the seal ring made of the synthetic resin has a surface roughness smaller than that of the sealing side of the seal ring groove.

With the sixth feature of the present invention, after the sealing side of the seal ring groove in the shaft member or the housing made of the aluminum alloy is initially worn by a fixed amount, innumerable oil pots are defined in the sealing side of the seal ring groove, thereby reliably retaining the oil film at the pressure contact portions of the sealing sides of the seal ring groove and the seal ring to suppress the further advance of the wearing.

The above and other objects, features and advantages of the invention will become apparent from the following description of preferred embodiments taken in conjunction with the accompanying drawings.

DESCRIPTION OF THE PREFERRED EMBODIMENTS

A first embodiment of the present invention will now be described with reference to FIGS. 1 to 7.

Figure 1:
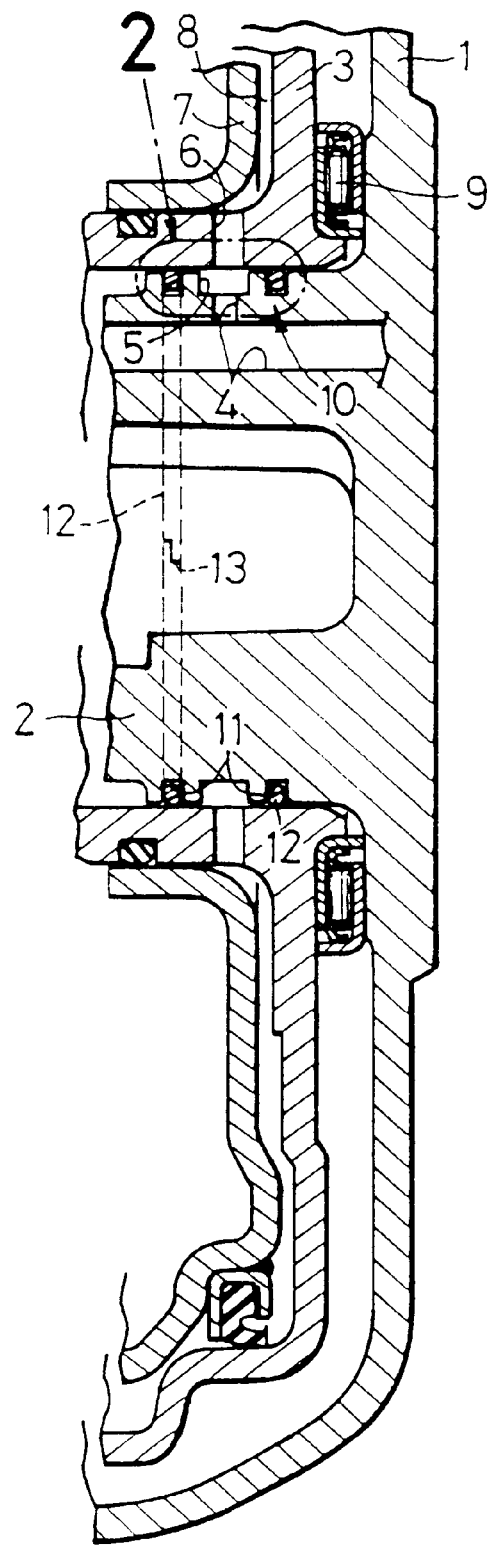
FIG. 1 is a vertical sectional view of a hydraulic machinery equipped with a hydraulic seal system according to a first embodiment of the present invention.
Figure 2:
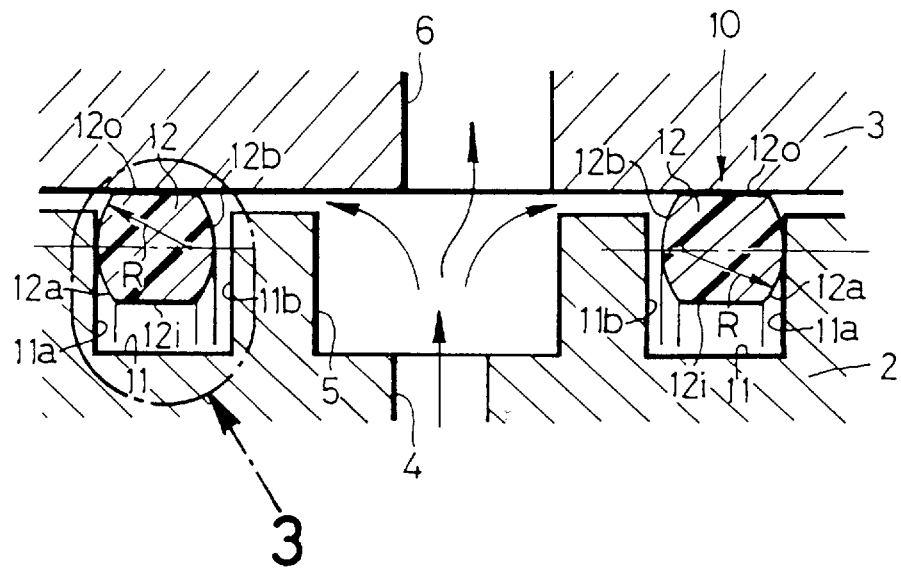
FIG. 2 is an enlarged view of a portion encircled by the dashed line 2 in FIG. 1.

Referring first to FIGS. 1 and 2, a shaft member 2 is integrally provided on an inner wall of a stationary casing 1 to protrude therefrom, and a housing 3 is rotatably fitted over an outer periphery of the shaft member 2. A thrust bearing 9 is interposed between the casing 1 and the housing 3.

An oil passage 4 is provided in the shaft member 2 and has an upstream portion which is connected through a control valve to a hydraulic pressure source such as an oil pump (both not shown), and a downstream portion which communicates with an oil passage 6 in the housing 3 through an annular channel 5 in the outer periphery of the shaft member 2. The oil passage 6 is connected to a hydraulic pressure chamber 8 in the hydraulic actuator 7 such as a piston of a hydraulic clutch provided in the housing 3. Thus, if a hydraulic pressure in the hydraulic pressure source is supplied to the oil passage 4, the hydraulic pressure can be transferred via the annular channel 5 and the oil passage 6 to the hydraulic pressure chamber 8 to operate the hydraulic actuator 7.

A small gap is provided between the opposed peripheral surfaces of the shaft member 2 and the housing 3 for permitting the relative rotation of the shaft member 2 and the housing 3. In order to prevent, to the utmost degree, the leakage of the hydraulic pressure from the annular channel 5 through the small gap to the outside, a hydraulic seal system 10 which will be described below is provided.

A pair of seal ring grooves 11, 11 are defined in the outer periphery of the framework material of shaft member 2 and positioned on opposite sides of the annular channel 5. Seal rings 12, 12 are mounted in the seal ring grooves 11, 11. Each of the seal rings 12 has a single split or abutment 13 so that the seal ring 12 may be mounted in the seal ring groove 11 by opening the seal ring 12 at the abutment 13.

The shaft member 2 is made of an aluminum alloy, and the housing 3 is made of a steel plate. The seal ring 12 is made of a synthetic resin having a fixed elasticity. Examples of suitable synthetic resins are PES (polyether sulfone), PPS (polyphenylene sulfide), PEEK (polyether-ether ketone), PI (polyimide), and PAS (polyallyl sulfone). Particularly, a preferable synthetic resin to be used is one having a hardness $H_{RM}$ of 80 to 120, a tensile strength of 700 to 1800 kg f/cm², and a continuous heat resisting temperature of at least 180° C.

Axially opposite sides 11a and 11b of each seal ring channel 11 are formed into flat surfaces. One side 11a of the sides 11a and 11b that is positioned outwardly farther from the annular channel 5 is called a sealing side 11a of the seal ring channel 11. The surface roughness of the sealing side 11a is set in a range of Rmax 3.0 to 6.3 μm.

In the seal ring 12 made of a synthetic resin, the inner and outer peripheral surfaces 12i and 12o are formed into concentric cylindrical surfaces, and the axially opposite sides 12a and 12b are formed into convex curved surfaces with their radially central portions raised, thereby providing a barrel-like shape in cross section. The radius R of curvature of the convex curved surface is set in a range of 3 to 130 mm, desirably, at approximately 11 mm. As used herein, one side 12a of the opposite sides 12a and 12b positioned outwardly farther from the annular channel 5 is called a sealing side 12a of the seal ring 12. The surface roughness of the sealing side 12a is set smaller than that of the sealing side 11a of the seal ring groove 11, i.e., at a value smaller than Rmax 3.0 μm.

The seal ring 12 is formed into such a size that its outside diameter in its free condition is slightly larger than the inside diameter of the housing 3, so that when the seal ring 12 is mounted in the seal ring groove 11, the outer peripheral surface 12o of the seal ring 12 is brought into substantially close contact with the inner peripheral surface 3a of the housing 3.

The operation of the first embodiment will be described below.

Referring to FIG. 1, if a hydraulic pressure is supplied through the oil passage 4 in the shaft member 2 to the oil passage 6 in the housing 3, the hydraulic pressure is also transferred to the seal ring groove 11 and applied to the inner peripheral surface 12i of the seal ring 12 and the inner side 12b, so that the outer peripheral surface 12o of the seal ring 12 is put into pressure contact with the inner peripheral surface 3a of the housing 3 and the outer side, i.e., the sealing surface 12a of the seal ring 12 is put into pressure contact with the sealing side 11a of the seal ring groove 11. If the housing 3 is rotated relative to the shaft member 2 in this condition, the frictional torque created between the outer peripheral surfaces 12o of each seal ring 12 and the inner peripheral surface 3a of the housing 3 is larger than the frictional torque created between the sealing sides 12a and 11a of the seal ring 12 and the seal ring groove 11, and hence, the seal ring 12 is rotated following the housing 3, so that relative rotating and sliding movements of the sealing sides 11a and 12a occur.

Figure 3:
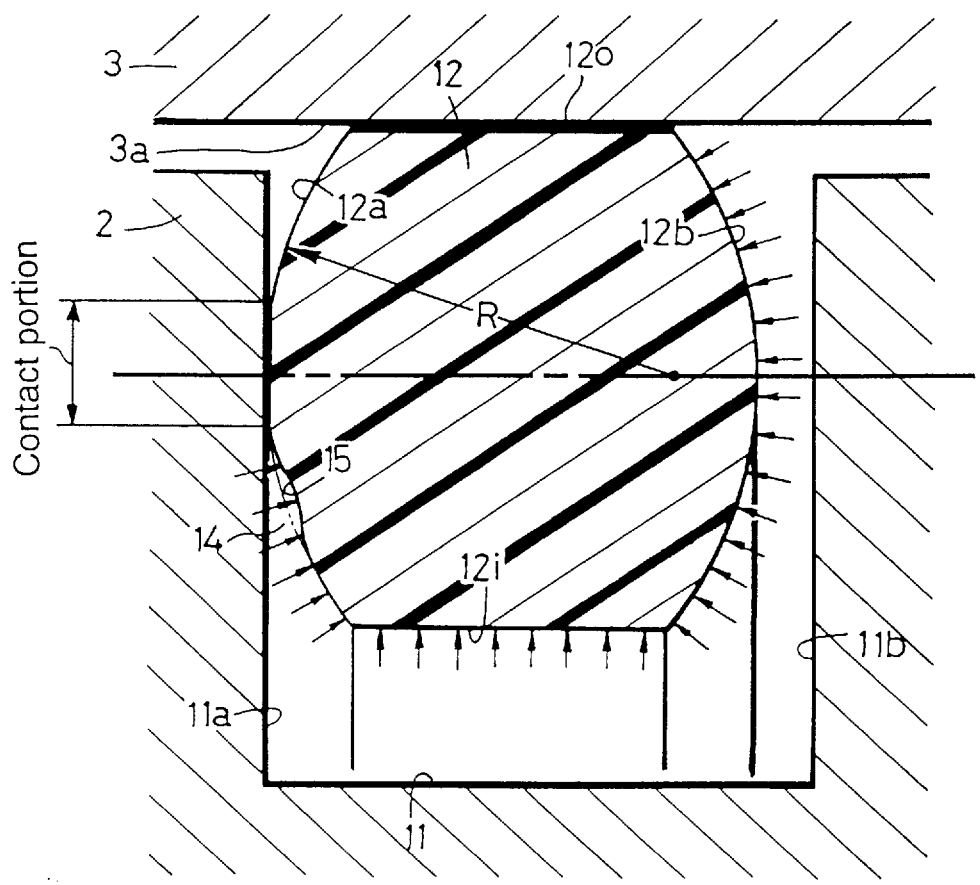
FIG. 3 is a further enlarged view of a portion encircled by the dashed line 3 in FIG. 2.

If the sealing sides 11a and 12a are observed in detail at that time, a gap 14 triangular in section is formed radially inside the pressure contact portions of the sealing sides 11a and 12a, as shown in FIG. 3, because the sealing side 12a of the seal ring 12 is in the form of a convex curved surface, as described above. The oil entering the gap 14 provides a compression and deformation to the sealing side 12a of the seal ring 12 in such a manner that an inner portion of the gap 14 is widened by the pressure of the oil itself and by a centrifugal hydraulic pressure produced by the rotation of the seal ring 12 following the housing 3, thereby generating a hydraulic pocket 15 connected to the pressure contact portion.

The generation of the hydraulic pocket 15 reduces the contact area of the sealing sides 11a and 12a, but the hydraulic pressure from the hydraulic pocket 15 is applied to the sealing sides 11a and 12a in a direction to move them away from each other and hence, the pressure of contact of both the seal lateral faces 11a and 12a is decreased slightly. Moreover, the hydraulic pocket 15 joins smoothly with the pressure contact portions of both the sealing sides 11a and 12a and therefore, oil is satisfactorily supplied from the hydraulic pocket 15 to the pressure contact portions by a capillary phenomenon. As a result, an oil film is effectively formed and maintained to prevent the solid contact of the sealing sides 11a and 12a with each other. When the hydraulic pressure is varied, the amount of compression and deformation of the sealing side 12a of the seal ring 12 is varied to increase the volume of the hydraulic pocket 15, thereby making it possible to suppress the variation in pressure of contact between the sealing sides 11a and 12a to the minimum.

Thus, the sealing sides 11a and 12a can perform a good sealing while being smoothly rotated and slid relative to each other, thereby preventing the hydraulic pressure from leaking out of the seal ring groove 11. In this case, a small amount of oil is leaked through the abutment 13 of the seal ring 12, but the leaked oil is supplied for the lubrication of the contact portions of the shaft member 2 and the housing 3 and of the thrust bearing 9.

The seal system of the present invention was subjected to the following tests to confirm the performance thereof.

Figure 4A:
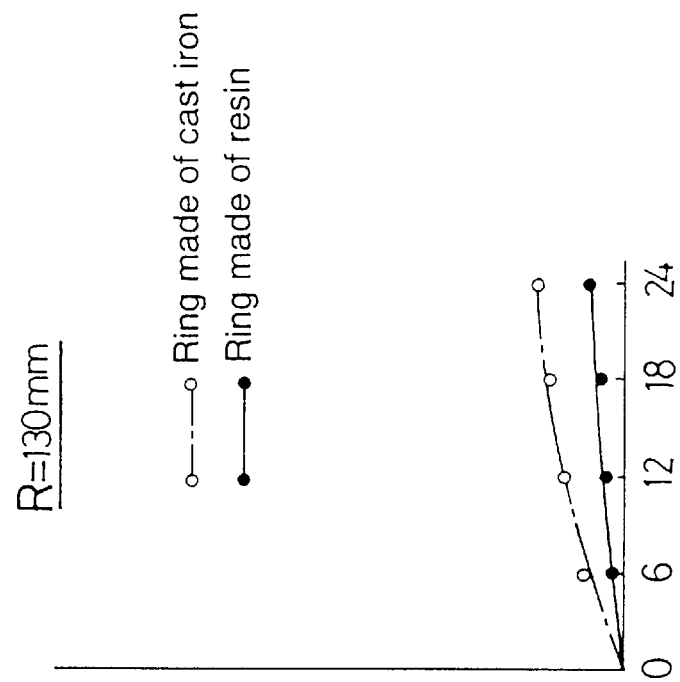
FIGS. 4A, 4B and 4C are graphs showing the results of tests comparing the sealing-side contact pressure between the system according to the present invention and the known system.
Figure 4B:
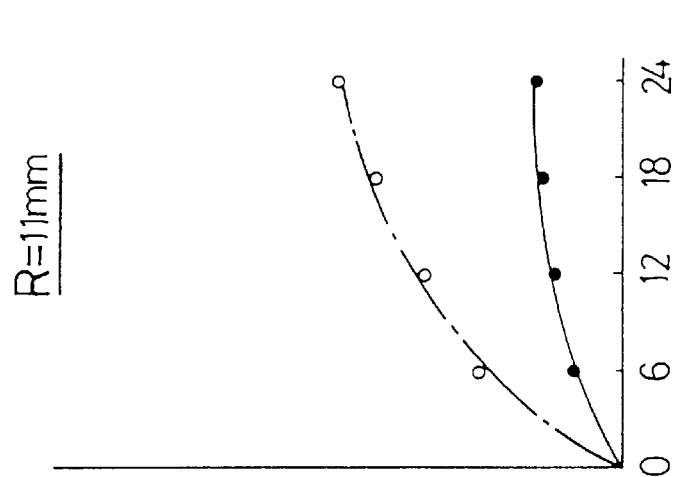
Figure 4C:
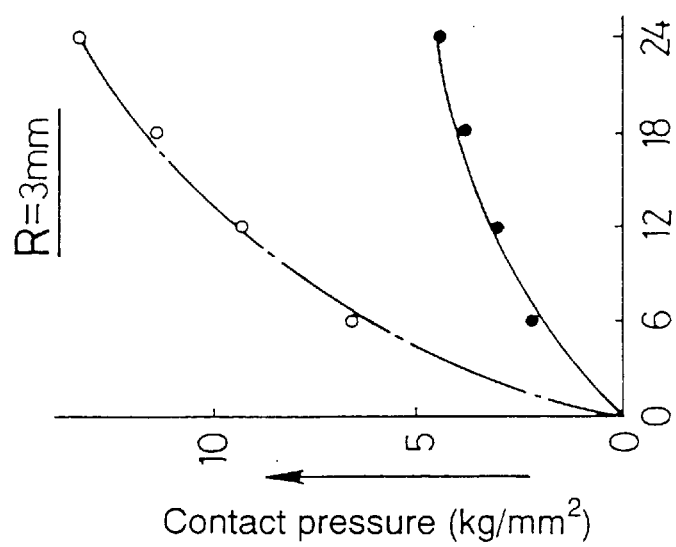

(1) Sealing side contact pressure test (see FIGS. 4A, 4B and 4C)

As seal rings for the test, three seal rings (having radii R of 3, 11 and 130 mm, respectively) made of PEEK according to the present invention, and three known seal rings (having radii R of 3, 11 and 130 mm, respectively) made of a cast iron were prepared as testing seal rings. Each of these seal rings was mounted in the seal ring groove 11 in the shaft member 2 made of an aluminum alloy, and a hydraulic pressure was applied to the seal ring to measure the pressure of contact between the sealing sides of the seal ring and the seal ring groove. The results are shown in FIGS. 4A, 4B and 4C.

It can be seen from the test results that with the known seal ring made of cast iron, the dimension of the radius of curvature of the sealing side exerts a strong influence on the contact pressure, and the variation in hydraulic pressure sensitively affects the variation in contact pressure. In contrast, with the seal ring made of PEEK according to the present invention, such influence is relatively small and moreover, the contact pressure is continually low. Furthermore, there are only small changes in contact pressure with changes in hydraulic pressure. Thus, when the seal ring of the present invention is formed by a molding process, it is possible to establish a wider range of dimensional accuracy for the radius R of curvature of the sealing side, and moreover, the contact pressure can be stabilized and maintained at a low level, regardless of the change in hydraulic pressure. Therefore, an improvement in wear resistance of both of the sealing sides of the seal ring groove and the seal ring can be expected.

Figure 5A:
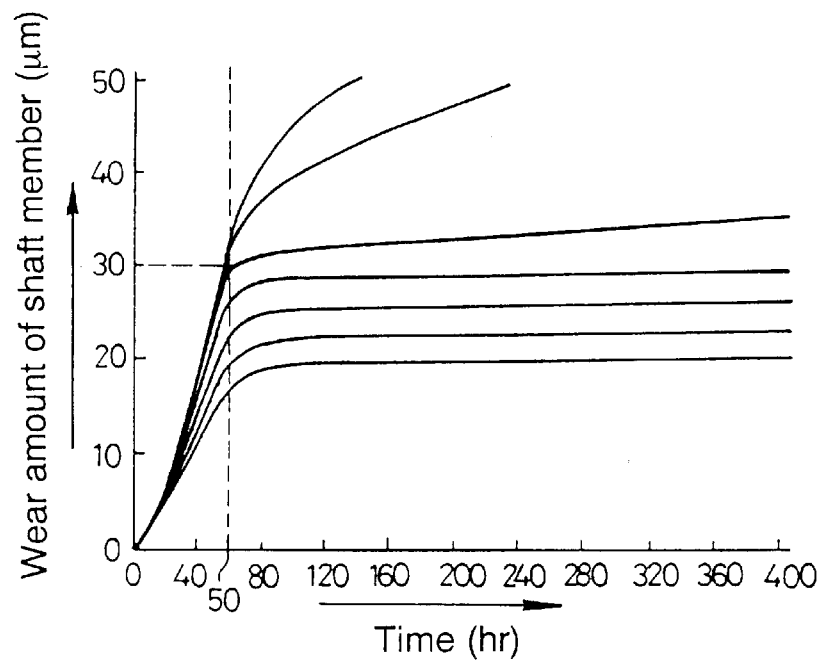
FIGS. 5A and 5B are graphs showing the results of tests comparing the hardness of the seal ring and the wear amount of the shaft member in the system according to the present invention.
Figure 5B:
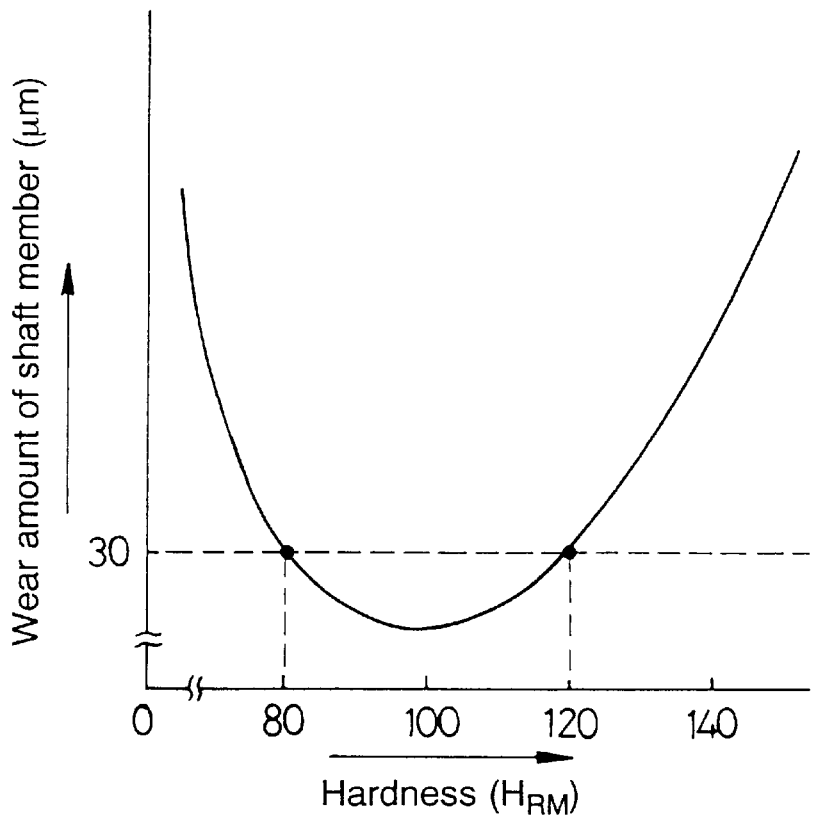
Figure 6:
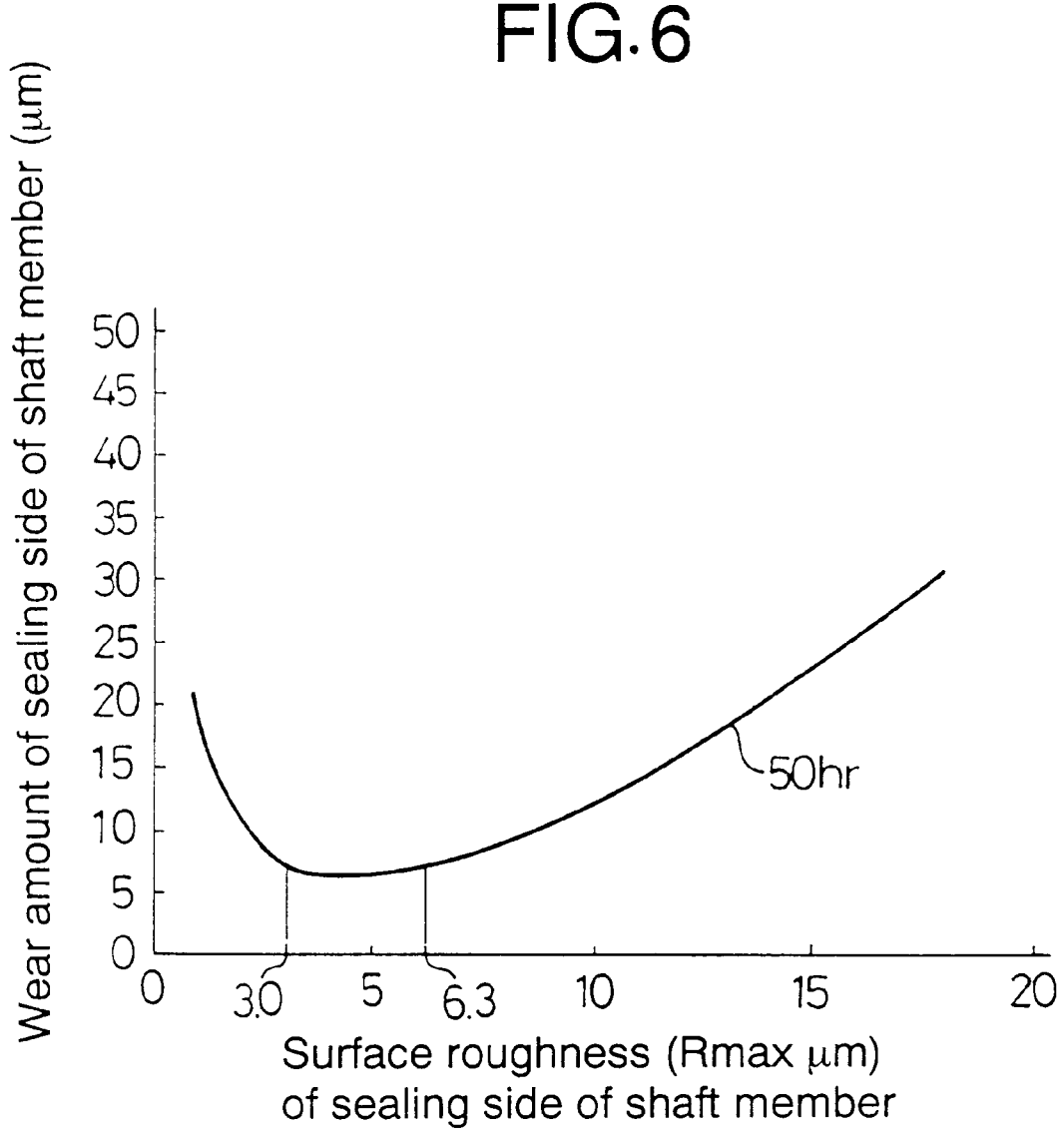
FIG. 6 is a graph showing the relationship between the surface roughness and the wear amount of the sealing side, which is obtained from results of wearing of the sealing side of the seal ring groove.

(2) Test for the relationship between the hardness of the seal ring 12 made of the synthetic resin and the wear amount of the shaft member 2 made of the aluminum alloy (see FIGS. 5A and 5B)

Test Conditions
  hydraulic pressure=12 kg f/cm$^2$
  oil temperature=120° C.
  speed of rotation of the housing 3=6,500 rpm
  test duration=400 hr
Seal ring 12
  material=PEEK
  size=Φ42×1.5×1.5 mm
  R=11 mm
Shaft member 2
  material=AC2B aluminum alloy
Housing 3
  material=FC250 (N/mm$^2$) steel plate FIG. 5A shows the results provided by measuring the wear amount of the shaft member with the seal ring 12 having a hardness of 70 to 130 H$_{RM}$ being mounted thereon, i.e., the wear amount of the sealing side with passage of time. It can be seen from the results that when about 50 hours has elapsed from the start of the test, the wear amount of the shaft member 2 is equal to or smaller than 30 μm, and thereafter, the wearing of the shaft portion 2 progresses very little.

Thereupon, the hardness of the seal ring 12 enough to keep the wear amount of the shaft member 2 at 30 μm was examined when 50 hours had elapsed from the beginning of the test and as a result, it was made clear from the results shown in FIG. 5B that the hardness was in a range of from 80 to 120 $H_{RM}$.

Accordingly, if the hardness of the seal ring 12 is set in a range of from 80 to 120 $H_{RM}$, it is possible to insure the endurance of the shaft member 2, and in turn, it is possible to maintain a good hydraulic sealability over a long time.

(3) Test for the relationship between the surface roughness and the wear amount of the sealing side 11a of the shaft member 2 made of the aluminum alloy (see FIGS. 6, 7A, 7B, 7C and 7D)

Test Conditions
  hydraulic pressure=12 kgf/cm²
  oil temperature=120° C.
  speed of rotation of housing 3=6,500 rpm
  test duration=50 hr.
Seal ring 12
  material=PEEK
  size=Φ42×1.5×1.5 mm
  Roughness of surface (barrel-polished after injection molding)=Rmax 3 to 18 μm
Shaft member 2
  material=AC2B aluminum alloy
Housing 3
  material=FC250 (N/mm²) steel plate The wear amount of the sealing side 11a after the lapse of 50 hours from the start of the test was measured and the results showed that, as can be seen from FIG. 4, the wear amount of the sealing side with the surface roughness set in a range of 3.0 to 6.3 μm was smallest (at approximately 5 μm wear) and stable, whereas the wear amount of the sealing side with surface roughness set at a value out of the above range quickly increased.

Figure 7A:
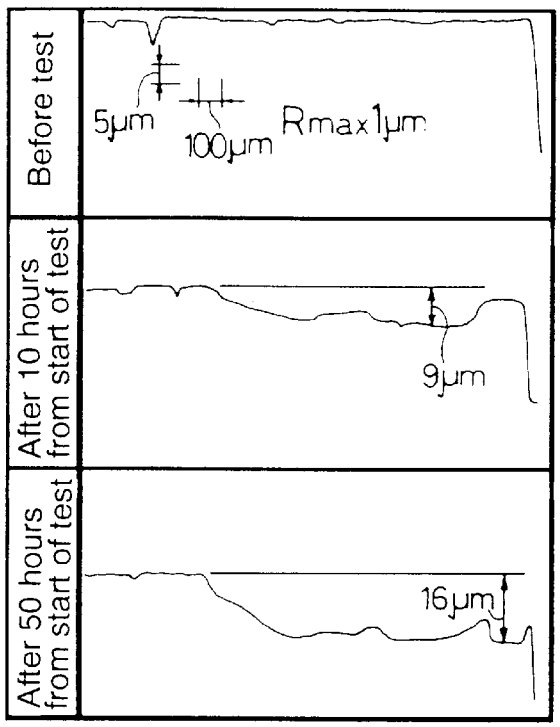
FIGS. 7A, 7B, 7C and 7D are enlarged sectional views showing the states of the sealing side of the seal ring groove before the start of a wear test, upon an initial wearing and after a lapse of 50 hours from the start of the test, wherein FIG. 7A corresponds to the case where the sealing side has a surface roughness of Rmax 1 μm, FIG. 7B corresponds to the case where the sealing side has a roughness of Rmax 3 μm, FIG. 7C corresponds to the case where the sealing side has a roughness of Rmax 10 μm, and FIG. 7D corresponds to the case where the sealing side has a roughness of Rmax 18 μm.
Figure 7B:
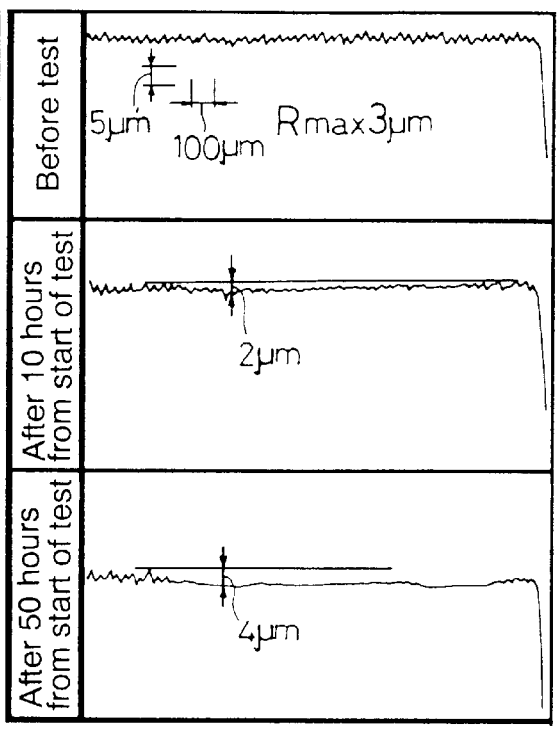
Figure 7C:
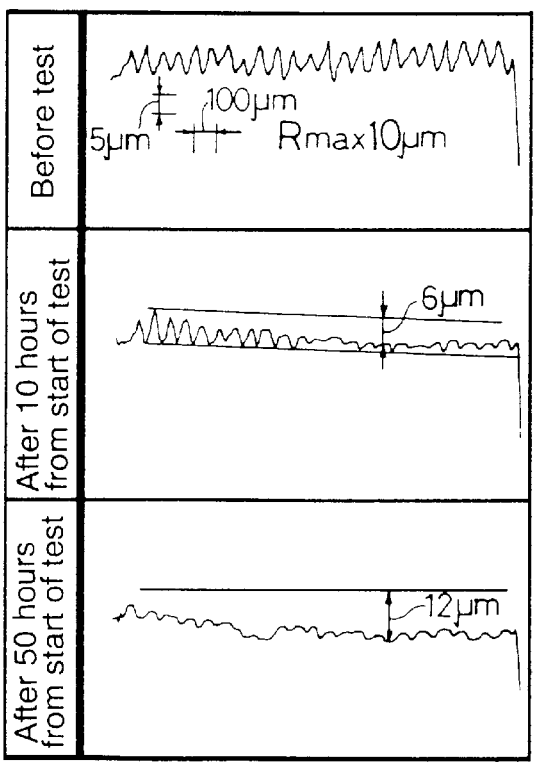
Figure 7D:
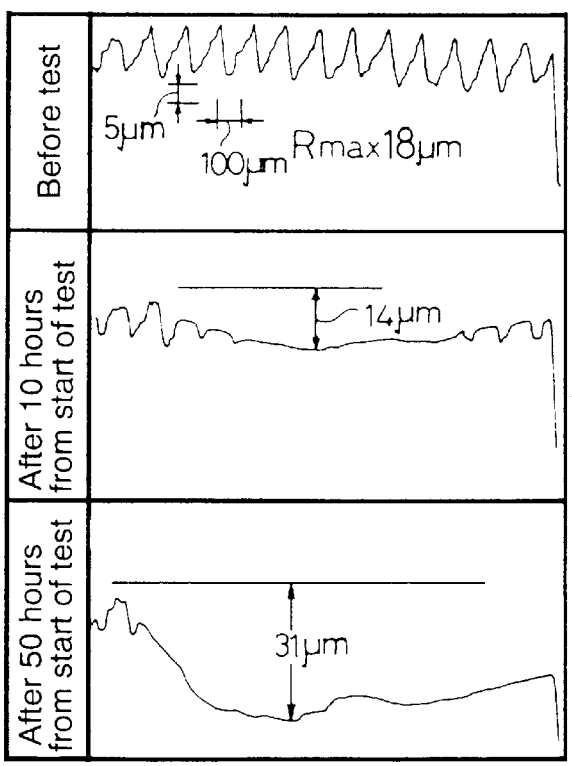

The sealing side 11a of the seal ring groove 11 was observed after the wear test and the results as shown in FIGS. 7A–D (which are enlarged sectional views of the sealing side 11a) were obtained. FIG. 7A shows the results when the surface roughness of the sealing side 11a is Rmax 1 μm; FIG. 7B shows the results when the surface roughness is Rmax 3 μm; FIG. 7C shows the results when the surface roughness is Rmax 10 μm; and FIG. 7D shows the results when the surface roughness is Rmax 18 μm. From the results in FIGS. 7A to 7D, it is believed that if the surface roughness of the seal lateral face 11a is appropriate, i.e., in a range of Rmax 3.0 to 6.3 μm, the oil film at the pressure contact portions is reliably retained to provide a good lubrication, thereby suppressing the subsequent progression of the wearing, by cooperation of the fact that the acute tops of the crests of processing scars on the sealing side 11a are worn (initially worn) into a flatness to a certain extent and thereafter, the innumerable valleys of the processing scars form oil pots having an oil retainability, with the fact that the flat tops of the innumerable crests improve the wettability.

In the above-mentioned test, the wear amount of the sealing side 12a of the seal ring 12 was far smaller than that of sealing side 11a of the shaft member 2.

A second embodiment of the present invention will now be described with reference to FIGS. 8 to 14.

Figure 8:
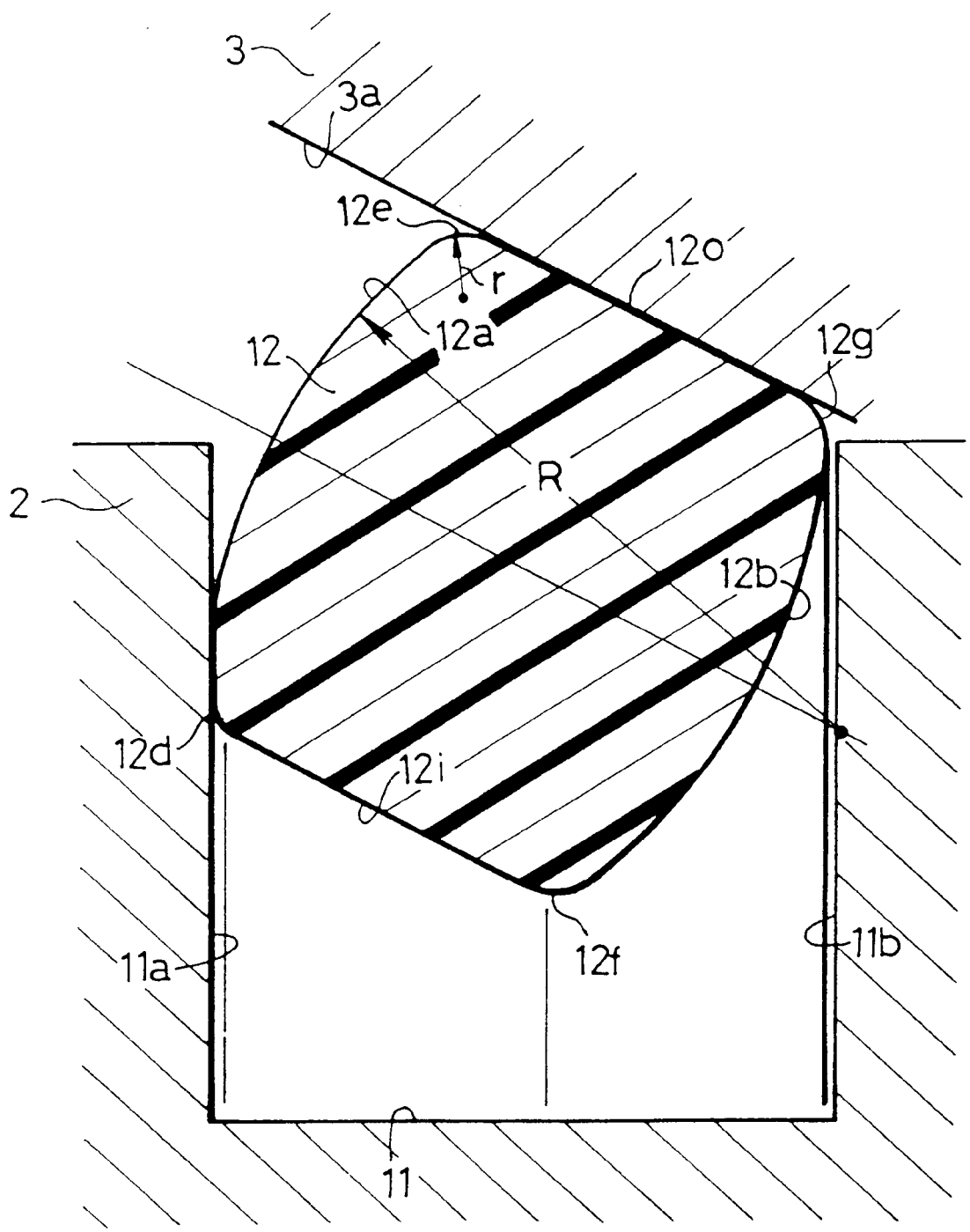
FIG. 8 is an enlarged sectional view of the hydraulic seal system according to a second embodiment of the present invention, when the housing is excessively inclined.
Figure 9:
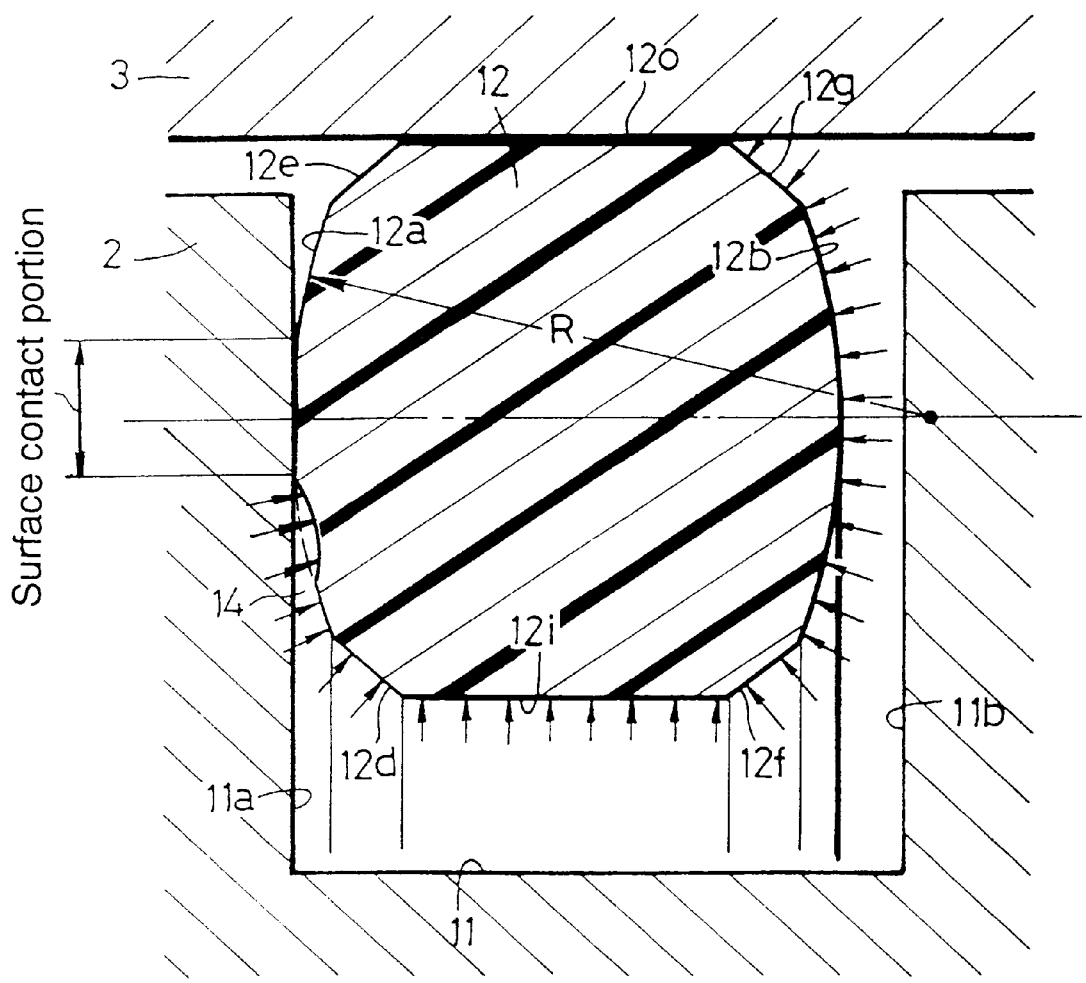
FIG. 9 is a sectional view similar to FIG. 8, but showing a modification of a seal ring.

The second embodiment of the present invention is of the same construction as the previously described embodiment except that, as shown in FIGS. 8 and 9, the corners 12d to 12g of the seal ring 12 at which outer peripheral surfaces 12i and 12o intersect opposite sides 12a and 12b are subjected to a chamfering, and that a moderate torsional elasticity is provided to the seal ring 12. In FIGS. 8 and 9, portions or components corresponding to those in the first embodiment are designated by like reference characters.

In FIG. 8, the corners 12d to 12g are chamfered into an arc-shape and in FIG. 9, the corners 12d to 12g are chamfered into a cone-shape.

In the case where the shaft member 2 and the housing 3 are inclined due to their deflection, as shown in FIG. 8, the seal ring 12 is torsionally deformed in a manner to follow such inclination by the hydraulic pressure received by the inner peripheral surface 12i of the seal ring 12, so that the outer peripheral surface 12o of the seal ring 12 is maintained in surface contact with the inner peripheral surface 3a of the housing 3 without gaps therebetween. Thus, it is possible for the seal ring 12 to continuously exhibit a normal outer periphery-sealing function. Further, the contact portion of the sealing side 12a in the form of the convex curved surface is only shifted in a manner that it is rolled on the flat sealing side 11a with such torsional deformation around the flat surface of the seal lateral face 11a, and the surface contact state is not changed. Thus, it is also possible to continuously exhibit a normal side-sealing function.

Furthermore, if the inclination of the shaft member 2 and the housing 3 becomes excessive, the corners 12d and 12e, at which the sealing side 12a of the seal ring 12 is connected to the inner and outer peripheral surfaces 12i and 12o, is brought into contact with the sealing side 11a of the seal ring groove 11 by the advancement of the torsional deformation of the seal ring 12. However, since the corners 12d and 12e have been chamfered, they are not brought into edge-contact states and can smoothly and rotatively slide on the flat sealing side 11a without cutting the oil film. As a result, it is possible to suppress the wearing of the sealing side 11a to the utmost degree.

The following test was carried out in order to examine whether there is a difference in wearing of the sealing side 11a of the seal ring groove 11 between the case where the corners 12d to 12g of the seal ring 12 were subjected to a chamfering and the case where they were not subjected to a chamfering.

Figure 10:
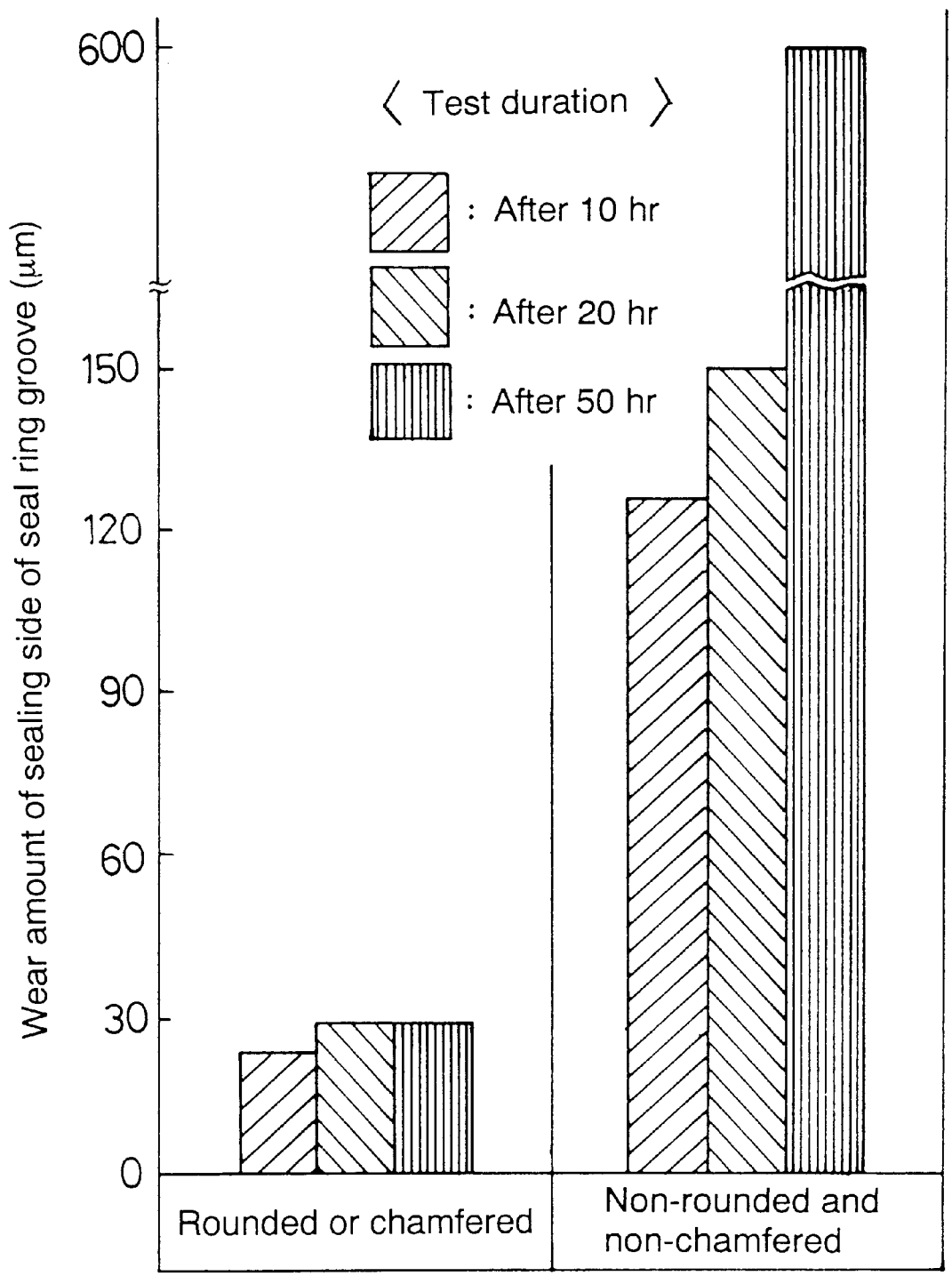
FIG. 10 is a graph showing the results of a wearing test for the sealing side of the seal ring groove.
Figure 11A:
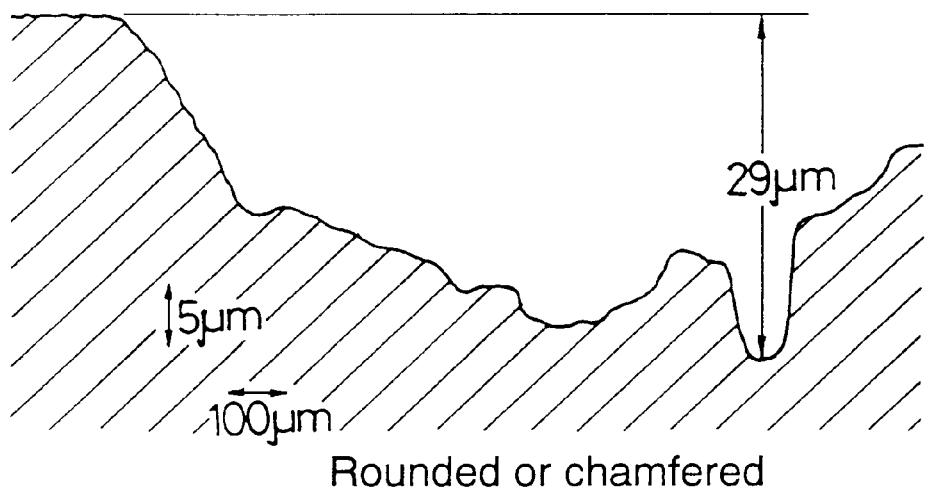
FIGS. 11A and 11B are sectional views showing the worn state of the sealing side after a lapse of 50 hours from the start of the test, wherein FIG. 11A corresponds to the case where the corners of the seal ring are chamfered, and FIG. 7B corresponds to the case where the corners of the seal ring are not chamfered.
Figure 11B:
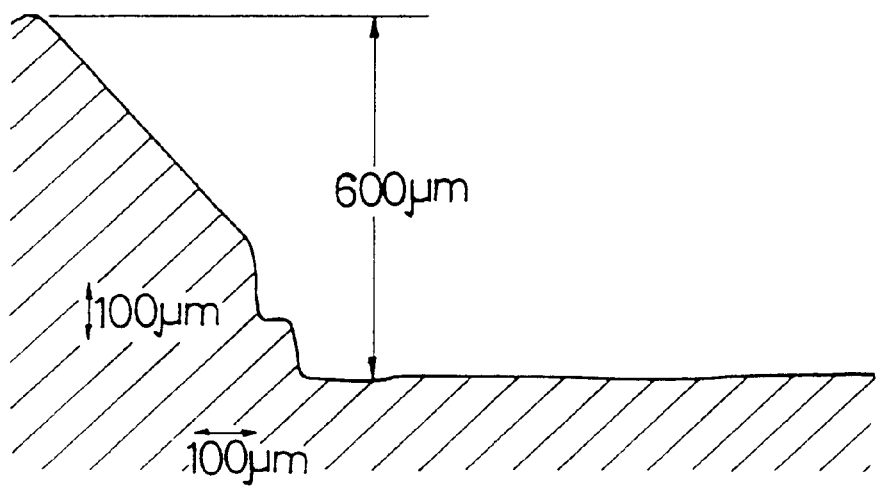

Test Conditions
  hydraulic pressure=12 kgf/cm²
  oil temperature=120° C.
  speed of rotation of housing 3=6,500 rpm
  As shown in FIG. 8, the housing 3 is moved to describe a conical locus, so that the corners of the seal ring 12 contact with the sealing side 11a of the seal ring groove 11.
Seal ring 12
  material=PEEK
  size=Φ42×1.5×1.5 mm
  R=11 mm
Shaft member 2
  material=AC2B aluminum alloy
Housing 3
  material=FC250 (N/mm²) steel plate The test results are shown in FIGS. 10, 11A and 11B. As is apparent from FIG. 10, in the case where there is a chamfer at each of the corners of the seal ring 12, even after a lapse of test durations of 10, 20 and 50 hours, the wear amount of the sealing side 11a of the seal ring groove 11 is increased very little over the initial wear amount of about 30 μm. In contrast, in the case where there is no chamfer, the wear amount of the sealing side 11a of the seal ring groove 11 is quickly increased to 130, 150, and 600 μm with passage of test durations of 10, 20 and 50 hours.

FIGS. 11A and 11B show the worn state of the sealing side 11a of the seal ring groove 11 after 50 hours of testing. FIG. 11A shows the worn state in the case where there is a chamfer at each of the corners of the seal ring 12, and FIG. 11B shows the worn state in the case where there is no chamfer.

It was confirmed by the above-mentioned test that the chamfering of the corners of the seal ring 12 is extremely effective for reducing the wearing of the sealing side 11a of the seal ring groove 11 when the shaft member 2 and the housing 3 are substantially inclined with respect to each other.

If molding flashes are produced at the corners 12d to 12g of the seal ring 12 upon formation of the seal ring 12 of a synthetic resin by molding, and the corners 12d to 12g are subjected to a chamfering simultaneously with the removal of such flashes after the formation, it is possible to improve the processing efficiency.

Based on the above-described confirmation, a mold for forming a seal ring 12 in such a manner that flashes are produced at the corners 12d and 12e of the seal ring 12 will be described with reference to FIGS. 12 to 14.

A stationary inner die 22 having a runner 21 and a stationary outer die 23 surrounding the stationary inner die 22 are mounted to a base 20 of an injection molding machine. A movable outer die 25 is fitted over an outer periphery of a movable inner die 24 which is opposed to the stationary inner die 22 for advancing and retreating movements. An actuating rod 26 is connected to a back of the movable outer die 25 for advancing and retreating the movable outer die 25. A gate 27 is provided in the movable inner die 24 and is put into communication with the runner 21, when the mold is closed.

Figure 12:
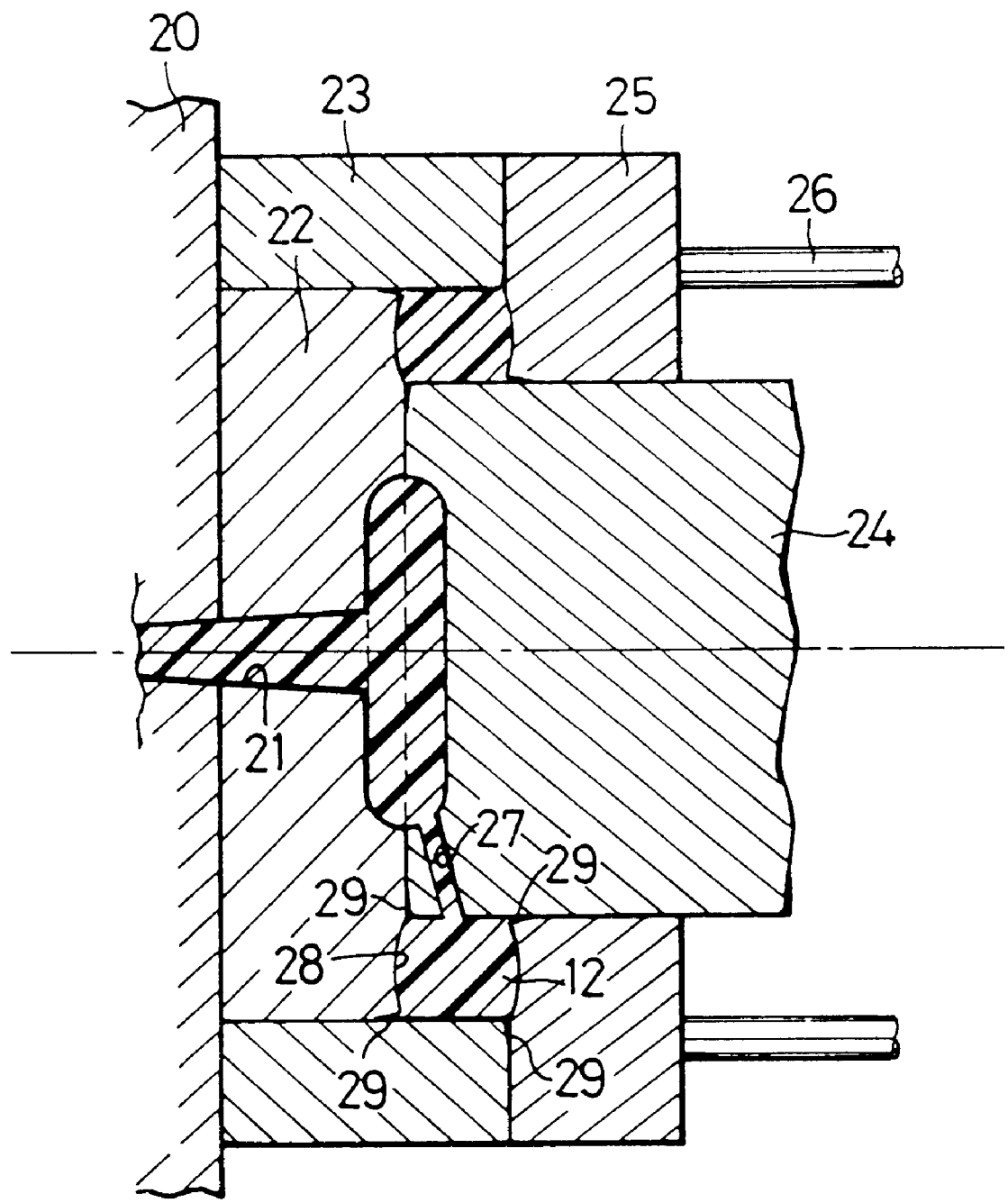
FIG. 12 is a vertical sectional view of a seal ring forming mold which is in a closed state.

When the mold is closed as shown in FIG. 12, a cavity 28 for forming the seal ring 12 is defined by the four dies 22 to 25. The cavity 28 is in communication with the runner 21 via the gate 27. Thus, when a molten resin is injected into the runner 21 by the injection molding machine, the molten resin is poured through the gate 27 into the cavity 28, where the seal ring 12 is formed. At that time, the inner and outer peripheral surfaces 12i and 12o of the seal ring 12 are formed by the movable inner die 24 and the stationary outer die 23, and the opposite sides 12a and 12b are formed by the stationary inner die 22 and the movable outer die 25. The mating faces of the four dies 22 to 25 are located at the angular corners 12d to 12g of the seal ring 12 and hence, flashes 29 are produced at the corners 12d to 12g.

Figure 13:
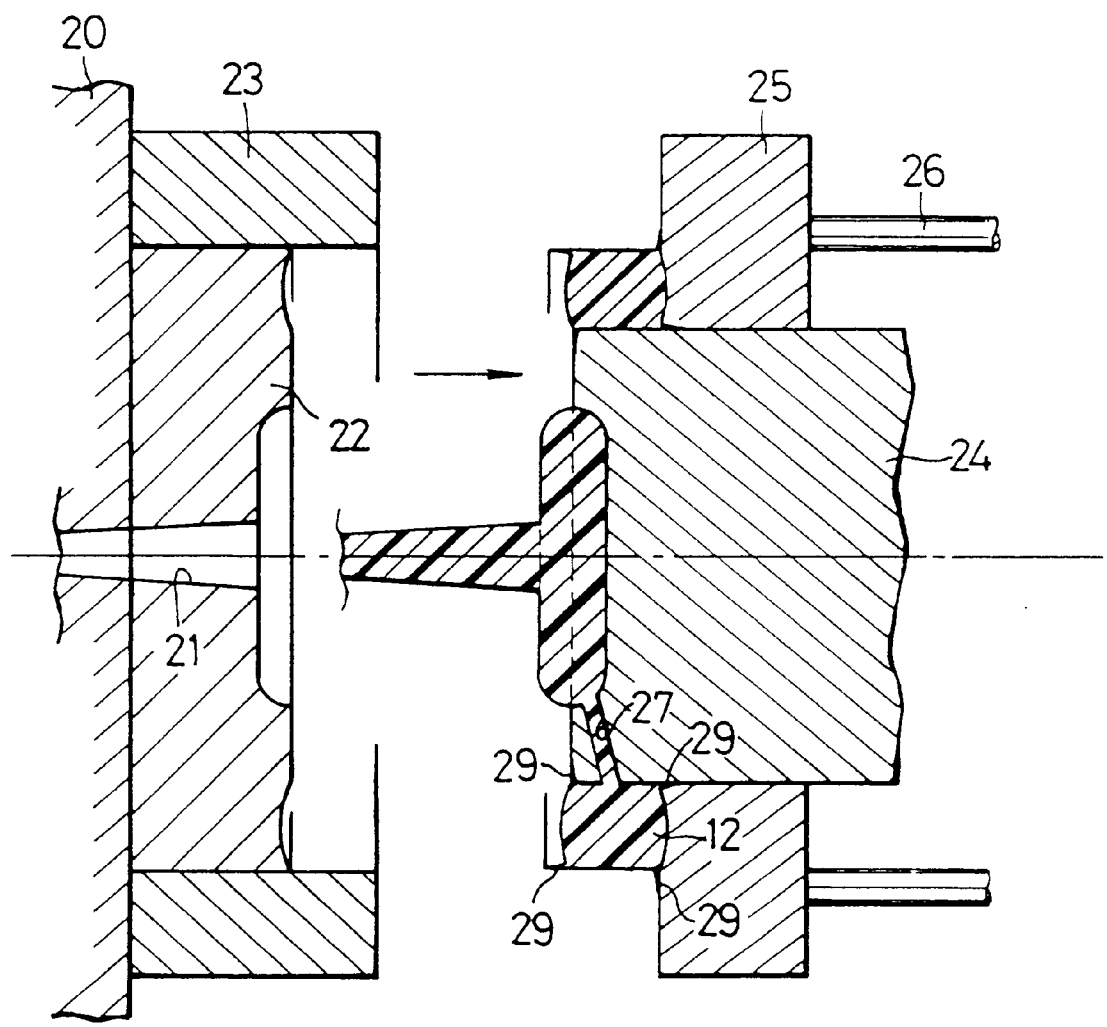
FIG. 13 is a vertical sectional view of the mold which is in an opened state.
Figure 14:
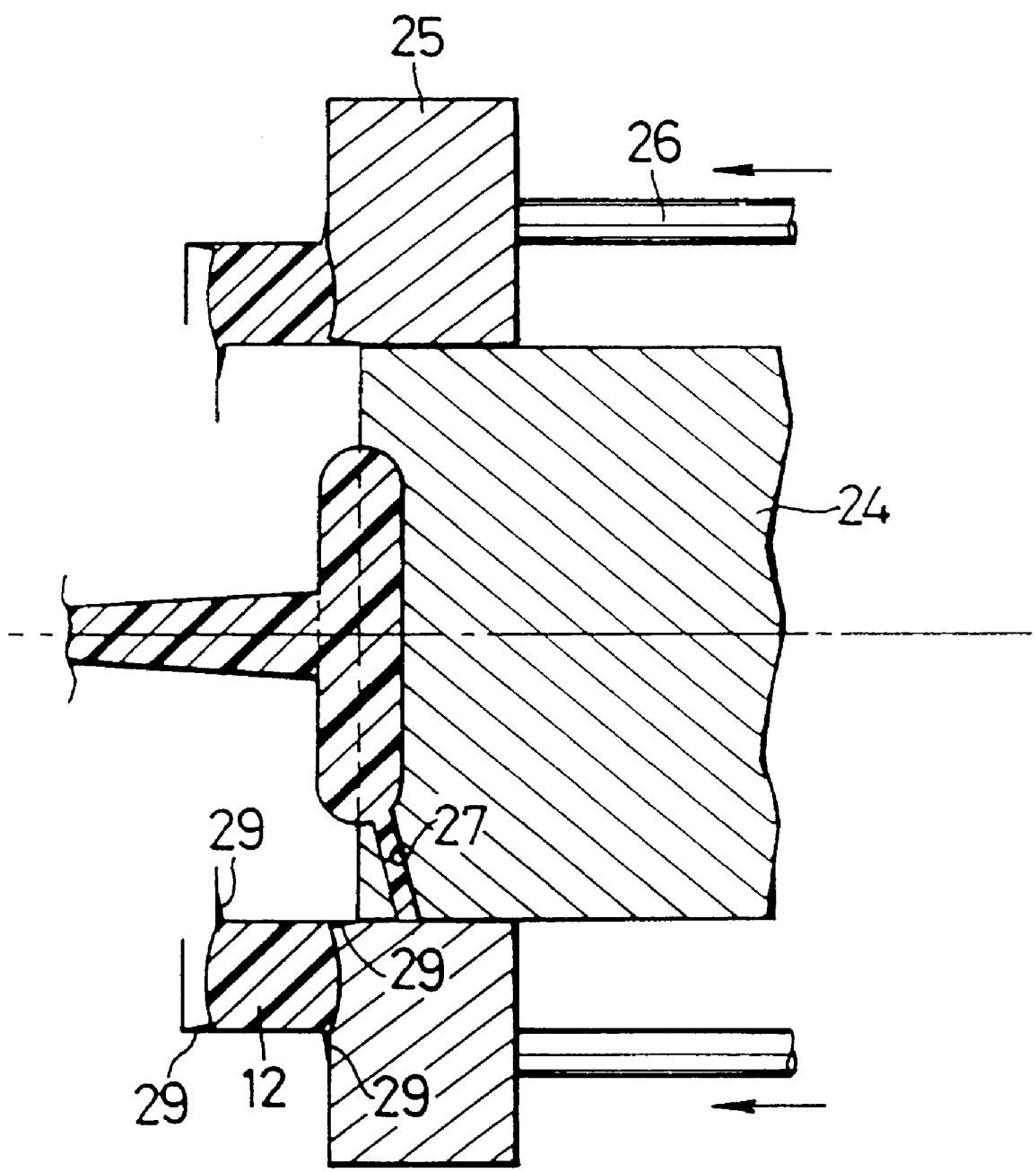
FIG. 14 is a vertical sectional view of the mold, when a formed seal ring is released from the mold.

Then, the mold is opened by a procedure shown in FIGS. 13 and 14, and the seal ring 12 is ejected. At the next step, the corners 12d to 12g are subjected to a chamfering, while removing the flashes 29 on the seal ring 12. Accordingly, the steps are simplified, and in removing the flashes, there is no possibility that the outer peripheral surface 12o and the sealing side 12a that are important for the sealing function are damaged.

Although the embodiments of the present invention have been described in detail, it will be understood that the present invention is not limited to the above-mentioned embodiments, and various modifications in design may be made without departing from the spirit and scope of the invention defined in claims. For example, since the side 12b opposite from the sealing side 12a of the seal ring 12 does not contribute to the sealing action, this side 12b can be formed into a flat surface.

What is claimed is:

1. A hydraulic seal system, comprising: an annular seal ring groove which is defined in one of mutually opposed peripheral surfaces of a shaft member and a housing surrounding said shaft member, said shaft member and said housing being relatively rotatably disposed; and a seal ring mounted in said seal ring groove and having one of inner and outer peripheral surfaces being flat and contacting the other of the peripheral surfaces of said shaft member and said housing, when said seal ring receives a hydraulic pressure, and a mutually opposed sealing side of said seal ring and a sealing side of said seal ring groove are in pressure contact with each other under the hydraulic pressure, wherein said sealing side of said seal ring groove is a substantially flat surface extending between a base of said seal ring groove and an open edge thereof at said peripheral surface of said shaft member or housing containing said seal ring groove, and said sealing side of said seal ring is a substantially convex curved surface with a radially central raised portion, said seal ring being of a synthetic resin having an elasticity such that, when a hydraulic pressure is applied to said seal ring, said sealing side of said seal ring is elastically deformed in said radially central raised portion to form a flat surface contact area against said sealing side of said seal ring groove spaced from said open edge and to form a hydraulic pocket extending away from said surface contact area and between said sealing sides of said seal ring and said seal ring groove.

2. A hydraulic seal system according to claim 1, wherein a hardness of said seal ring is set in a range of 80 to 120 $H_{RM}$.

3. A hydraulic seal system according to claim 1 or 2, wherein said shaft member is made of an aluminum alloy.

4. A hydraulic seal system according to claim 3, wherein said seal ring groove is in said shaft member.

5. A hydraulic seal system according to claim 1 or 2, wherein said seal ring includes a cylindrical outer peripheral surface and the synthetic resin has an elasticity such that when the shaft member is inclined to the housing said seal ring is torsionally and elastically deformed to maintain a surface contact of the flat peripheral surface of said seal ring with said other of the peripheral surfaces of said shaft member and said housing by the hydraulic pressure.

6. A hydraulic seal system according to claim 5, wherein each corner of said seal ring at which said sealing side intersects inner and outer peripheral surfaces is chamfered.

7. A hydraulic seal system according to claim 6, wherein each said chamfered corner is chamfered by removing molding flash at said corner.

8. A hydraulic seal system according to claim 1 or 2, wherein said one of said shaft member and said housing having said seal ring groove is made of an aluminum alloy, said sealing side of said seal ring groove in contact with said surface contact area of said seal ring has a surface roughness set in a range of Rmax 3.0 to 6.3 $\mu$m, and said sealing side of said seal ring made of the synthetic resin has a surface roughness smaller than that of said sealing side of said seal ring groove.

9. A hydraulic seal system for two relatively rotatable members, comprising an annular seal ring groove defined in one member and a sealing side of the seal ring groove being a substantially flat surface extending between a base of said seal ring groove and an open edge thereof at a peripheral surface of said one member, and a seal ring for positioning in the seal ring groove and having a convex curved side surface for engaging the sealing side of the seal ring groove on a portion of said substantially flat surface spaced from said open edge, said seal ring being of a synthetic resin for elastically deforming under hydraulic pressure for forming, in said convex curved side surface, both a flat surface contact area against said sealing side of said seal ring groove and a hydraulic pocket at an initial point of pressure contact between said surface contact area of said seal ring and the sealing side of the seal ring groove.

10. A hydraulic seal system according to claim 9, wherein a hardness of said seal ring is set in a range of 80 to 120 $H_{RM}$.

11. A hydraulic seal system according to claim 9 or 10, wherein the member having the seal ring groove is an aluminum alloy.

12. A hydraulic seal system according to claim 9 or 10, wherein said seal ring includes a flat cylindrical peripheral surface and has an elasticity such that when the shaft member is inclined to the housing said seal ring is torsionally and elastically deformed to maintain a surface contact of the said flat cylindrical peripheral surface of said seal ring with an opposing peripheral surface of the other member by the hydraulic pressure.

13. A hydraulic seal system according to claim 9 or 10, wherein each corner of said seal ring at which said convex curved side surface intersects inner and outer peripheral surfaces is chamfered.

14. A hydraulic seal system according to claim 9 or 10, wherein said member having said seal ring groove is made of an aluminum alloy, the sealing side of the seal ring groove in contact with said surface contact area of said seal ring has a surface roughness set in a range of Rmax 3.0 to 6.3 $\mu$m, and said convex curved side surface of said seal ring has a surface roughness smaller than that of the sealing side of the seal ring groove.

15. A hydraulic seal system according to claim 14, wherein said seal ring includes a flat cylindrical peripheral surface and has an elasticity such that when the shaft member is inclined to the housing said seal ring is torsionally and elastically deformed to maintain a surface contact of the flat cylindrical peripheral surface of said seal ring with an opposing peripheral surface of the other member by the hydraulic pressure.

16. A hydraulic seal system according to claim 15, wherein each corner of said seal ring at which said convex curved side surface intersects inner and outer peripheral surfaces is chamfered.

* * * * *

UNITED STATES PATENT AND TRADEMARK OFFICE
CERTIFICATE OF CORRECTION

PATENT NO.    : 5,941,534                                  Page 1 of 1
DATED         : August 24, 1999
INVENTOR(S)   : Terao et al.

It is certified that error appears in the above-identified patent and that said Letters Patent is hereby corrected as shown below:

<u>Title page,</u>
Item [73], Assignee, please add the following: -- Kabushiki Kaisha Riken --

Signed and Sealed this

Twenty-seventh Day of January, 2004

JON W. DUDAS
*Acting Director of the United States Patent and Trademark Office*